United States Patent
Milley et al.

(10) Patent No.: US 9,207,109 B2
(45) Date of Patent: Dec. 8, 2015

(54) FLOW SENSOR WITH IMPROVED LINEAR OUTPUT

(71) Applicant: Honeywell International Inc., Morristown, NJ (US)

(72) Inventors: Andrew J. Milley, Hilliard, OH (US); Richard C. Sorenson, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 13/859,604

(22) Filed: Apr. 9, 2013

(65) Prior Publication Data

US 2014/0298919 A1   Oct. 9, 2014

(51) Int. Cl.
G01F 15/02 (2006.01)
G01F 1/688 (2006.01)
G01F 1/684 (2006.01)
G01F 1/696 (2006.01)

(52) U.S. Cl.
CPC .............. *G01F 15/022* (2013.01); *G01F 1/684* (2013.01); *G01F 1/688* (2013.01); *G01F 1/6965* (2013.01); *G01F 15/02* (2013.01)

(58) Field of Classification Search
CPC .................................. G01F 15/02; G01F 1/688
USPC ................ 73/202.5, 204.11–204.27, 861.01; 702/100; 219/483, 481; 392/465
See application file for complete search history.

(56) References Cited

U.S. PATENT DOCUMENTS

| 5,369,994 A | 12/1994 | Hecht et al. |
| 5,623,097 A | 4/1997 | Horiguchi et al. |
| 5,703,288 A | 12/1997 | Horiguchi et al. |
| 6,782,743 B2 * | 8/2004 | Koike et al. .................. 73/202.5 |
| 6,983,214 B2 * | 1/2006 | Hiraizumi et al. ............ 702/100 |
| 7,107,835 B2 | 9/2006 | Korniyenko et al. |
| 7,278,309 B2 | 10/2007 | Dmytriw et al. |
| 7,908,096 B2 | 3/2011 | Wang et al. |

FOREIGN PATENT DOCUMENTS

| EP | 1326062 A1 | 7/2003 |
| EP | 1617185 B1 | 4/2011 |
| GB | 2283328 A | 5/1995 |
| WO | 2011075571 A1 | 6/2011 |

OTHER PUBLICATIONS

International Search Report for Corresponding Serial No. EP141692021 Dated Jun. 11, 2014.
Hepp et al., "MEMS Sensor signal conditioning for a thermal flow meter," Electronic Engineering Times Europe, p. 42-44, Mar. 2013.

* cited by examiner

*Primary Examiner* — Lisa Caputo
*Assistant Examiner* — Tran M Tran
(74) *Attorney, Agent, or Firm* — Seager, Tufte & Wickhem LLP

(57) ABSTRACT

A flow sensor assembly includes a flow sensor for sensing a flow parameter. The flow sensor may provide a flow sensor output signal that is related to the sensed parameter. A control block operatively connected to the flow sensor may receive a measure related to the flow rate of the fluid stream and drive the heater of the flow sensor to a heater temperature, such that the heater temperature may be dependent on the flow rate of the fluid stream, which causes the analog output of the flow sensor to be relatively linear over an expected operating range of flow rates.

17 Claims, 7 Drawing Sheets

FLOW SENSOR WITH IMPROVED LINEAR OUTPUT

FIELD

The present disclosure relates generally to sensors, and more particularly, to flow sensors.

BACKGROUND

Flow sensors are commonly used in a wide variety of applications including, for example, medical applications, flight control applications, industrial process applications, combustion control applications, weather monitoring applications, as well as other applications. Flow sensors often provide a non-linear output. To help compensate for this, the non-linear analog output from a flow sensor is converted into the digital domain using an analog-to-digital converter. A microprocessor is then used to compensate the non-linear output of the flow sensor into a more linear output, which can be more readily used by a system. This compensation process, including converting the non-linear analog output of the flow sensor into the digital domain, can reduce the resolution and accuracy of the flow sensor.

SUMMARY

This disclosure relates generally to sensors, and more particularly, to flow sensors. In one illustrative embodiment, a sensor assembly includes a flow sensor having a heater and a control block operatively connected to the heater. The control block may be configured to receive a measure related to a flow rate of a fluid stream, and to drive the heater of the flow sensor to a heater temperature that is dependent on the measured flow rate of the fluid stream. When the heater temperature of the flow sensor is controlled based on the flow rate of the fluid stream, the flow sensor may be capable of outputting an analog output signal that is substantially linear over an expected operating range of flow rates.

In another illustrative embodiment, a flow sensor assembly may include a first flow sensor having a heating element, a microcontroller configured to control the heating element of the first flow sensor, and a second flow sensor. The microcontroller may control the heating element of the first flow sensor such that the heating element is driven to a heater temperature. The second flow sensor may provide a flow rate of a sensed fluid to the microcontroller for consideration in controlling the heating element of the first flow sensor. For example, the microcontroller may use the flow rate input provided by the second flow sensor to control the heater temperature of the heating element of the first flow sensor, such that the first flow sensor outputs an analog output signal that is substantially linear over an operating range of flow rates. In some cases, the flow sensor assembly may include a temperature sensor capable of measuring an ambient temperature of the incoming fluid over an operating temperature range. In such cases, and possibly other cases, the microcontroller may control the heater temperature of the heating element of the first flow sensor such that the first flow sensor outputs an analog output signal that is substantially linear over the operating range of flow rates and is substantially temperature independent over the operating temperature range.

In some instances, a method may be used to sense a flow rate with the flow sensor assembly and output an analog output signal that is substantially linear over an operating range of flow rates. The method may include heating a heater of a first flow sensor to a heater temperature to heat a fluid stream, sensing the heated fluid stream with the first flow sensor, and outputting from the first flow sensor an analog output signal that is related to a flow rate of the fluid stream. A temperature of the heater of the first flow sensor may be controlled based on a measure related to the flow rate of the fluid stream received from a second flow sensor and/or an ambient temperature received from an ambient temperature sensor to provide a substantially linear analog output over an operating range of flow rates and/or provide an analog output that is temperature independent over an operating temperature range.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
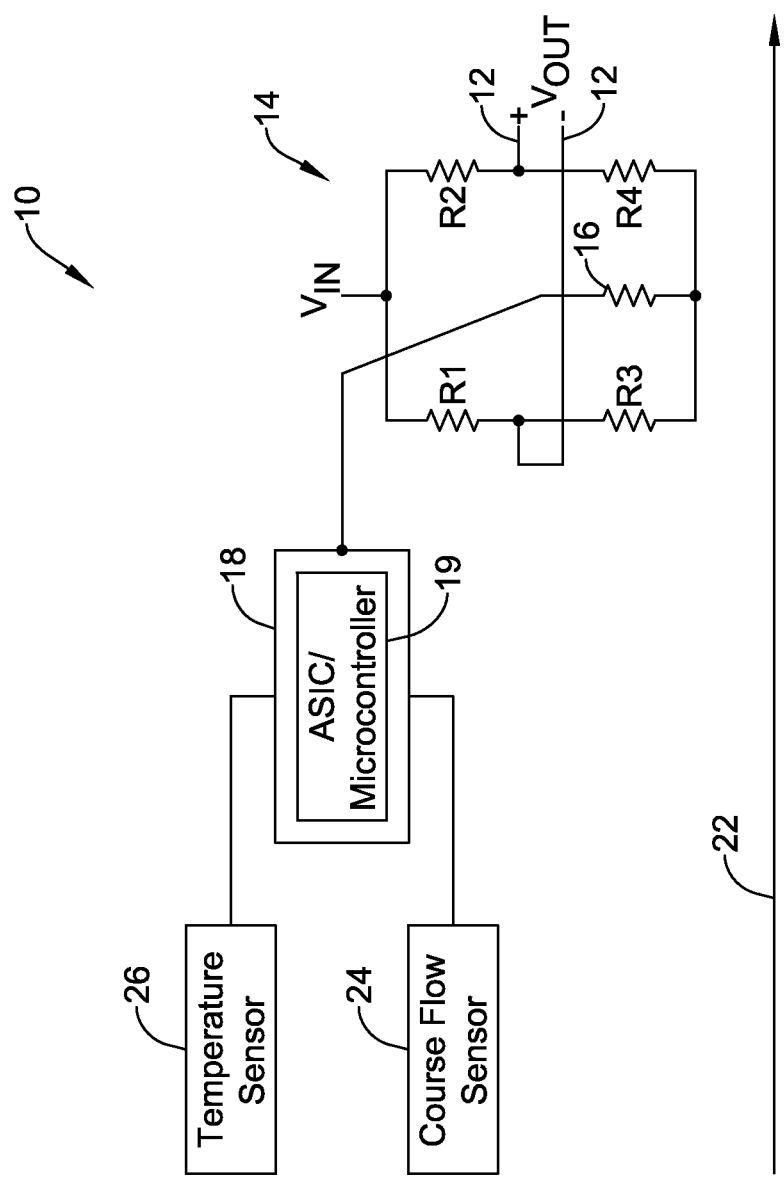
FIG. 1 is a schematic block diagram of an illustrative sensing assembly.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the claimed disclosure.

FIG. 1 is a schematic block diagram of an illustrative flow sensing assembly 10. The illustrative flow sensing assembly 10 includes a flow sensor 14 that produces or outputs an analog sensor output signal 12 that is substantially linear over an operating range of flow rates. The illustrative flow sensor 14 of FIG. 1 includes four sense elements (e.g., sense resistors R1, R2, R3, R4) connected in a full Wheatstone bridge configuration, which provides a differential analog sensor output signal 12. This, however, is just one example sensor configuration, and it is contemplated that any suitable sensor type and/or sensor configuration may be used, as desired. Also, it is contemplated that the flow sensor 14 may produce a differential or single ended analog sensor output signal 12, as desired.

Illustratively, an analog output signal 12 of the flow sensor 14 (e.g., the flow sensor 14 bridge circuit) may be considered linear if a defined nominal output of the flow sensor 14 is perfectly linear. An analog output signal 12 of the flow sensor 14 may be substantially linear if it is some level of error away from the defined linear nominal output of the flow sensor 14. For example, a flow sensor 14 analog output signal 12 may be substantially linear if the output reading differs from the defined linear nominal output of the flow sensor by less than 10% at any operating point along an expected operating range (e.g. span) of flow rates, less than 5%, less than 3%, less than 2%, less than 1%, between 1%-5%, between 2%-5%, between 1%-10%, or have any other similar percent error from an optimum or defined linear nominal output of the flow sensor.

Figure 5:
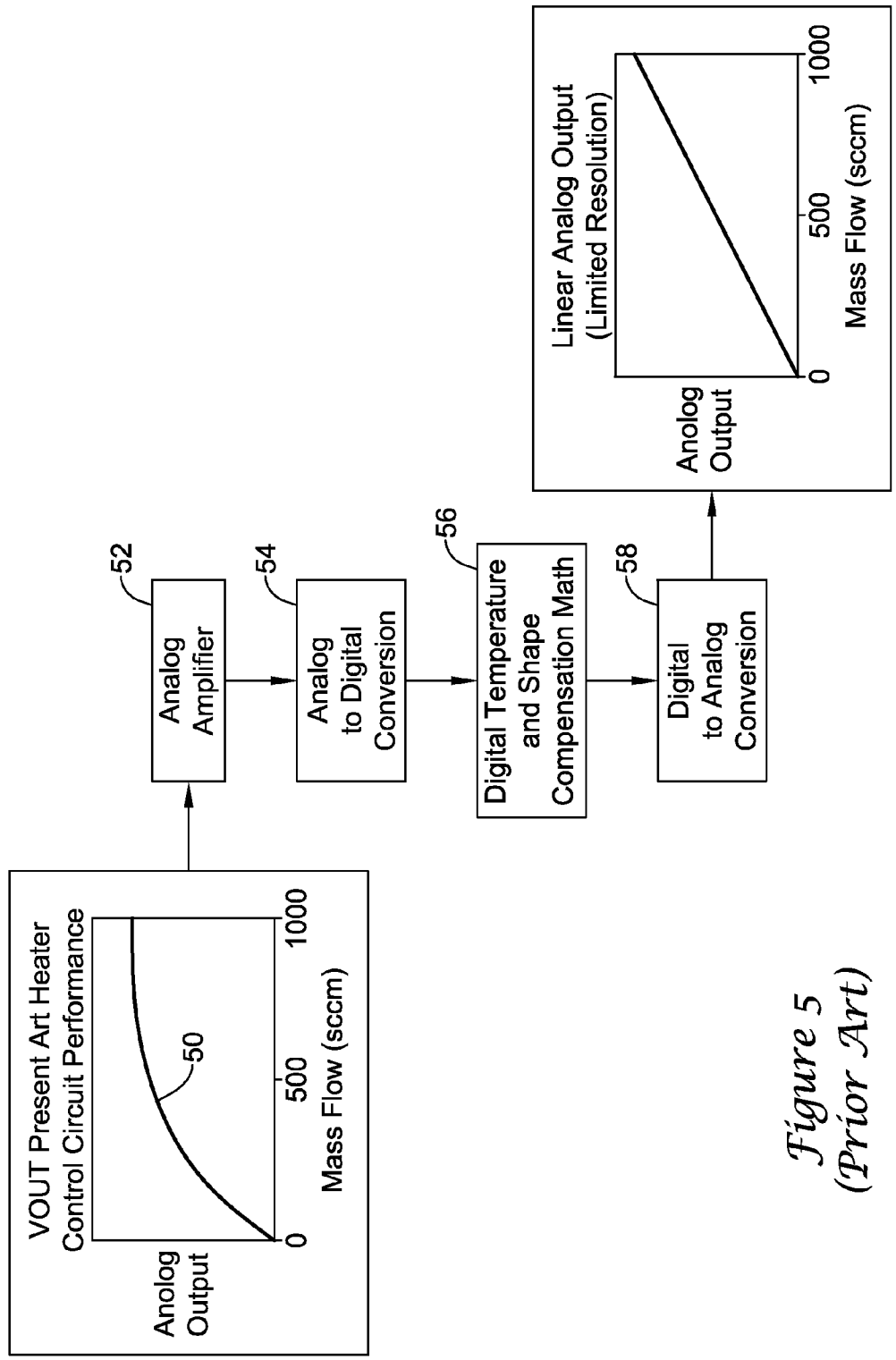
FIG. 5 is a schematic block diagram of an illustrative prior art post-signal production processing of a non-linear analog output signal from a flow sensor.

As shown in the graph of FIG. 5, typical flow sensors output a non-linear voltage output 50 over an operating range (i.e. span) of flow rates. For example, although the voltage output of a flow sensor may increase in response to an increase in flow rate, the non-linear voltage output 50 may not increase along a line.

In some instances, the flow sensor 14 of FIG. 1 may be a thermal anemometer type flow sensor and may include one or heating elements, such as heater 16, and one or more sense elements (e.g., resistors R1, R2, R3, R4, etc.) for sensing a flow rate of fluid flowing over or about flow sensor 14. The particular structure of the flow sensor 14 is not critical, and therefore is not discussed in more detail. As the fluid flows in the direction of arrow 22 in FIG. 1, the resistors R1, R4 may be positioned upstream of the heater 16, and the resistors R2, R3 may be positioned downstream of the heater 16. This, however, is not meant to be limiting. In some cases, only one or two sensor elements may be provided, and in other cases, five or more sensor elements may be provided. In some instances, all of the sense elements may be positioned upstream (or downstream) of the heater 16.

In some instances, the sense elements may be thermally sensitive resistors that have relatively large positive or negative temperature coefficients, such that the resistance of the resistors (e.g., R1, R2, R3, R4) varies with temperature. In some cases, the sense elements may be thermistors. In some instances, the sense elements, including the resistors R1, R2, R3, R4 may be arranged in a Wheatstone bridge configuration, but this is not required.

Illustratively, when no fluid flow is present about or over the flow sensor 14 and the heater 16 is heated to a temperature higher than an ambient temperature of the fluid flowing past the flow sensor 14, a temperature distribution may be created and transmitted in a generally symmetrical distribution about the heater 16 to upstream sensor elements (resistors R1, R4) and downstream sensor elements (resistors R2, R3). Thus, with no flow, upstream sensor elements and downstream sensor elements may sense the same or similar temperature (e.g., within 25 percent, 10 percent, 5 percent, 1 percent, 0.01 percent, 0.001 percent, etc.). In some cases, this may produce an analog sensor output signal 12 that is about zero because the Wheatstone bridge is balanced.

When a non-zero fluid flow is present over and/or about flow sensor 14, and the heater 16 is heated to a temperature higher than the ambient temperature of the fluid in the fluid flow, the symmetrical temperature distribution may be disturbed and the amount of disturbance may be related to the flow rate of the fluid flow over the flow sensor 14. The flow rate of the fluid may cause the upstream resistors R1, R4 to sense a relatively cooler temperature than the downstream resistors R2, R3. In other words, the flow rate of the fluid flow may cause a temperature differential between the upstream resistors R1, R4 and the downstream resistors R2, R3 that is related to the flow rate of the fluid flow over or about the flow sensor 14. The temperature differential between the upstream resistors R1, R4 and the downstream resistors R2, R3 may produce an analog sensor output signal 12 that is non-zero because the Wheatstone bridge becomes unbalanced.

In another illustrative instance, the mass flow and/or velocity of the fluid flow may be determined by providing a transient elevated temperature condition in the heater 16, which in turn, causes a transient elevated temperature condition (e.g., a heat pulse) in the fluid flow. When there is a non-zero flow rate in the fluid flow, the upstream resistors R1, R4 may receive a transient response later than the downstream resistors R2, R3. The flow rate of the fluid flow can then be computed using the time lag between the upstream resistors R1, R4 and the downstream resistors R2, R3, or between the time the heater 16 is energized and when the corresponding elevated temperature condition (e.g., heat pulse) is sensed by one of the upstream resistors R1, R4 and the downstream resistors R2, R3.

As shown in FIG. 1, the flow sensor assembly 10 may have a control block 18 operatively coupled to the heating element or heater 16 of the flow sensor 14. In some instances, the control block 18 may be configured to receive a measure related to the flow rate and/or other flow parameter of a fluid in a fluid stream passing over or about the flow sensor 14. With the measure(s) related to the flow rate and/or other flow parameter of the fluid in the fluid stream, the control block 18 may drive the heater 16 of the flow sensor 14 to a heater temperature that is dependent on the flow rate and/or other parameter of the fluid stream. In response to the control block 18 setting the heater 16 to a heater temperature that is dependent on the flow rate and/or other flow parameter(s), the flow sensor 14 may provide an analog output signal 12 that is substantially linear over an expected operating range of the flow rates of the fluid in the flow stream.

In some instances, the control block 18 may include an Application Specific Integrated Circuit (ASIC) or microcontroller 19, but this is not required. The ASIC or microcontroller 19 of the control block 18 may be configured to control a heater temperature setting of the heating element or heater 16 of the first flow sensor 14, such that the heating element or heater 16 may be driven to a desired heating temperature. In some instances, the control block 18 may include memory and/or a processor in the ASIC or microcontroller 19, where the memory may store one or more parameters for processing signals and outputting control signals.

In some instances, the ASIC or microcontroller 19 may include one or more lookup tables 21 stored in the memory, where the lookup tables may be configured to relate one or more parameters to a desired heater temperature of heater 16 of the flow sensor 14, such that the flow sensor 14 will provide an analog output signal 12 that is substantially linear over an operating range of flow rates. For example, the control block 18 may use a measure related to the flow rate of the fluid stream as an input to the lookup table 21 (see FIG. 2) to determine a heater temperature for the heater 16 that is dependent on the flow rate of the fluid stream. Alternatively, or in addition, the control block 18 may use an ambient temperature or other temperature measurement, other measures related to flow rate, or other flow parameters of the fluid in the fluid stream (such as pressure, humidity, type of fluid in the fluid stream, thermal conductivity of the fluid in the fluid stream, etc.) as input to the lookup table 21 to determine a heater temperature or heater temperature setting of the heater 16 that is dependent thereon.

In one example, the lookup table 21 may provide the correlation between a given flow rate of the fluid and a heater temperature setting such that the analog output signal 12 is substantially linear over a range of flow rates. Similarly, the lookup table 21 may provide the correlation between a given sensed ambient temperature of the fluid and the heater temperature setting such that the analog output signal 12 is substantially temperature independent over the range of flow rates. In some instances, the heater temperature setting for the heater 16 of the flow sensor 14 that is necessary to provide an substantially linear analog output may be determined via a lookup table 21 that is indexed by both a sensed flow rate of the fluid and a sensed ambient temperature of the fluid.

When provided, the lookup table 21 stored in or on the ASIC or microcontroller 19 of the control block 18 may be populated at any time. For example, the lookup table 21 may have known relationships that can be populated prior to calibration of the flow sensor assembly 10. Alternatively, or in addition, the lookup table 21 may have relationships that are populated at the time of calibration of the flow sensor assembly 10, after a calibration of the flow sensor assembly 10, or at any combination of times related or unrelated to a calibration of the flow sensor assembly 10.

In some instances, the ASIC or microcontroller 19 may include one or more parameters other than lookup table 21, such as programmed equations or any other data structures, that allow the ASIC or microcontroller 19 to control the heater temperature setting to produce an analog output signal 12 that is substantially linear over an expected operating range of flow rates.

In some cases, the ASIC or microcontroller 19 may include an analog-to-digital converter 30 configured to receive a flow rate input from a second flow sensor 24 and/or the ambient temperature from a temperature sensor 26. In some cases, the analog-to-digital converter 30 may receive the flow rate input from a second flow sensor 24 and/or ambient temperature from a temperature sensor 26 in analog signals and convert the signals to the digital domain so they are usable to index into the lookup table 21.

Additionally, or alternatively, the ASIC or microcontroller 19 may include a digital-to-analog converter 32 for providing an analog control signal to control the heater temperature of the heating element or heater 16. In some cases, the digital-to-analog converter 32 may receive a digital signal as a result of indexing a sensed flow rate and/or a sensed ambient temperature into a lookup table 21 in the ASIC or microcontroller 19 and convert the digital signal to the an analog control signal and then, provide the analog control signal (e.g. voltage or current signal) to the heating element or heater 16 to control the heater temperature.

In some instances, the flow sensor assembly 10 may include a first flow sensor 14 and a second flow sensor 24, as shown in FIGS. 1-4. Second flow sensor 24 may have the same configuration as the first flow sensor 14 or may have a different configuration, as desired. The first flow sensor 14 and the second flow sensor 24 may be positioned in a fluid stream such they are under the same flow rate conditions and/or temperatures conditions of the fluid stream.

Illustratively, the first flow sensor 14 may be considered a primary flow sensor and the second flow sensor 24 may be considered a secondary flow sensor. Additionally or alternatively, the first flow sensor 14 may be a fine flow sensor configured to provide a final and/or refined flow rate related output and the second flow sensor 24 may be a coarse flow sensor configured to provide an initial flow rate or other flow parameter measurement.

In some illustrative instances, the second flow sensor 24 may provide a measure related to the flow rate of the fluid stream (e.g., a flow rate input of the fluid) to the control block 18. The measure related to the flow rate of the fluid stream may be an initial flow rate measurement of the fluid in the fluid stream, a different flow parameter, or a combination thereof. Once the flow rate measurement reaches the control block 18, the ASIC or microcontroller 19 may use the flow rate input provided by the second flow sensor 24 in controlling the heater temperature of the heating element or heater 16 of the first flow sensor 14 so that the first flow sensor 14 outputs an analog output signal that is substantially linear over an operating range of flow rates.

Alternatively, or in addition to using the flow rate input to control the heater temperature of the heating element or heater 16, the ASIC or microcontroller 19 of the control block 18 may use a sensed temperature or sensed temperature parameter in controlling the heater temperature of the heating element or heater 16. For example, the ASIC or microcontroller 19 of the control block 18 may index a sensed temperature and/or the sensed flow rate into lookup table 21 to identify a heater temperature setting for the heating element or heater 16 of the first flow sensor 14 such that the first flow sensor 14 provides an analog output that is substantially linear with the respect to the flow rate sensed by the first flow sensor 14 over an operating range of flow rates and may be substantially independent of temperature. In one example, an analog output may be considered substantially independent of temperature if the analog output does not change by more than 10 percent over an operating temperature range (e.g. −55-125 degrees C.) of the flow sensor assembly 10, less than 5%, less than 3%, less than 2%, less than 1%, between 1%-5%, between 2%-5%, between 1%-10%, or any other suitable range.

In some instances, the flow sensor assembly 10 may include a temperature sensor 26 operatively connected to the control block 18, as shown in FIGS. 1-4. Illustratively, the temperature sensor 26 may be positioned in the fluid stream, such that the temperature sensor 26 is under the same flow rate conditions and/or temperatures conditions of the fluid stream as the first flow sensor 14 and/or the second flow sensor 24.

In one example, the temperature sensor 26 may be an ambient temperature sensor for sensing an ambient temperature of the fluid stream or other ambient temperature over an operating temperature range. Alternatively, or in addition, the temperature sensor 26 may measure a different temperature related to the fluid of the fluid stream. Once the temperature sensor 26 has sensed the ambient temperature of a fluid or other temperature parameter related to the fluid, the temperature sensor 26 may send the sensed temperature or sense temperature parameter to the ASIC or microcontroller 19 of the control block 18, which may then index the sensed temperature or temperature parameter into the lookup table 21.

The temperature sensor 26 may be operatively connected to the control block 18, such that it may be configured to relay a sensed temperature (e.g., an ambient temperature of the fluid stream or other sensed temperature) to the control block 18 or otherwise make the sensed temperature available to the control block 18. The received measure related to the sensed temperature may be utilized by the control block 18 to drive the heater 16 of the flow sensor 14 to a heater temperature that is at least partially dependent on the sensed temperature (e.g., sense ambient temperature of the fluid stream or other sensed temperature), the flow rate of the fluid in the fluid stream and/or both of the sensed temperature and the flow rate of the fluid in the fluid stream. For example, the control block 18 may use the measurement related to the flow rate of the fluid in the fluid stream and/or the measure related to the sensed temperature (e.g., the ambient temperature of the fluid stream or other sensed temperature) as inputs to one or more lookup table 21. Illustratively, the lookup table 21 may provide heater temperature settings for the heater 16 of the first flow sensor 14 that are related to and/or are dependent on the flow rate of the fluid stream and/or the sensed temperature (e.g., the ambient temperature of the fluid stream) and/or that may result in a substantially linear analog output signal 12 of the first flow sensor 14.

Figure 2:
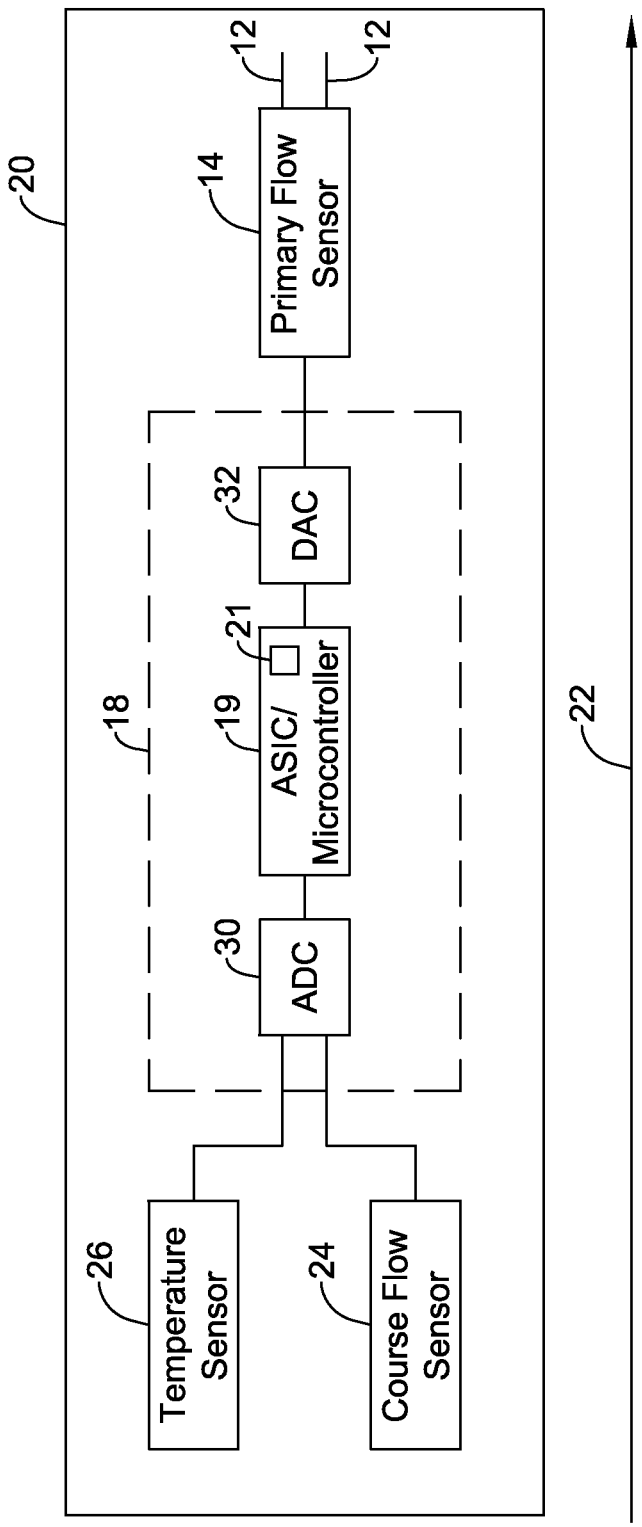
FIG. 2 is a schematic block diagram of an illustrative sensing assembly with a control block having one or more illustrative features separate from an ASIC or microcontroller.
Figure 3:
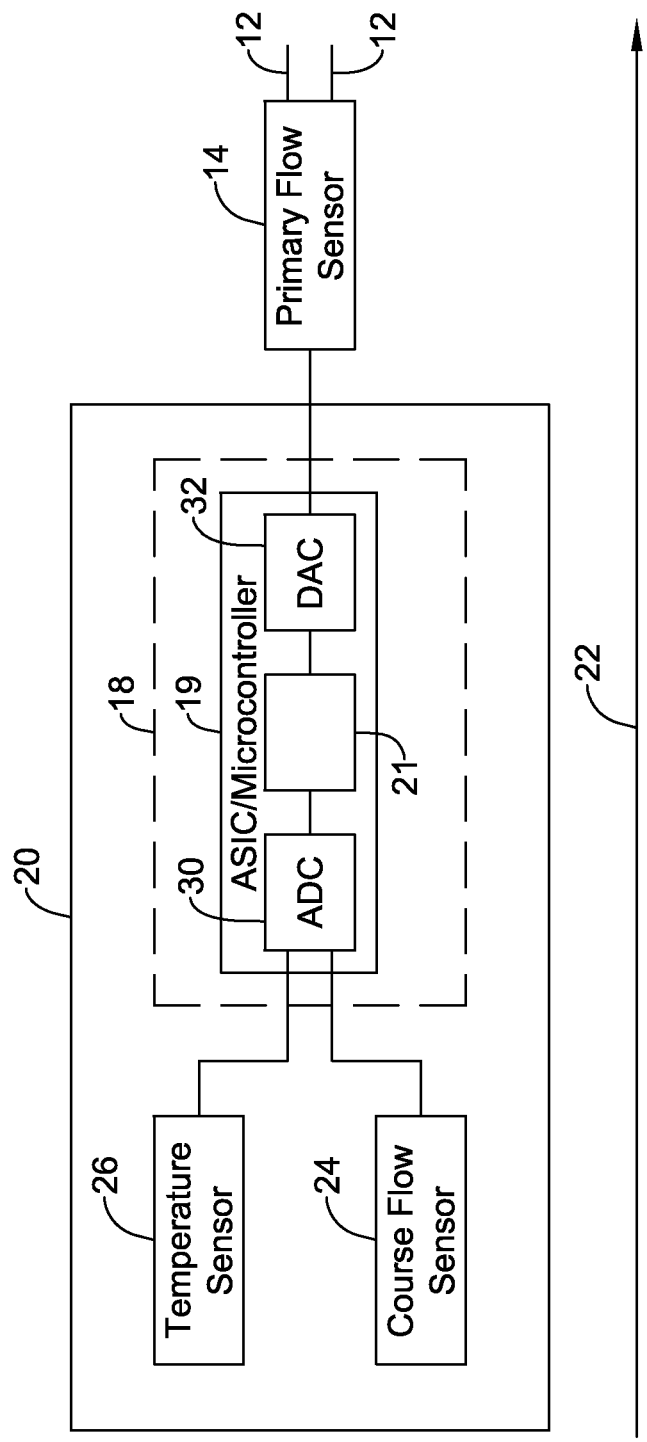
FIG. 3 is schematic block diagram of an illustrative sensing assembly with a control block having one or more illustrative features contained within an ASIC or microcontroller.
Figure 4:
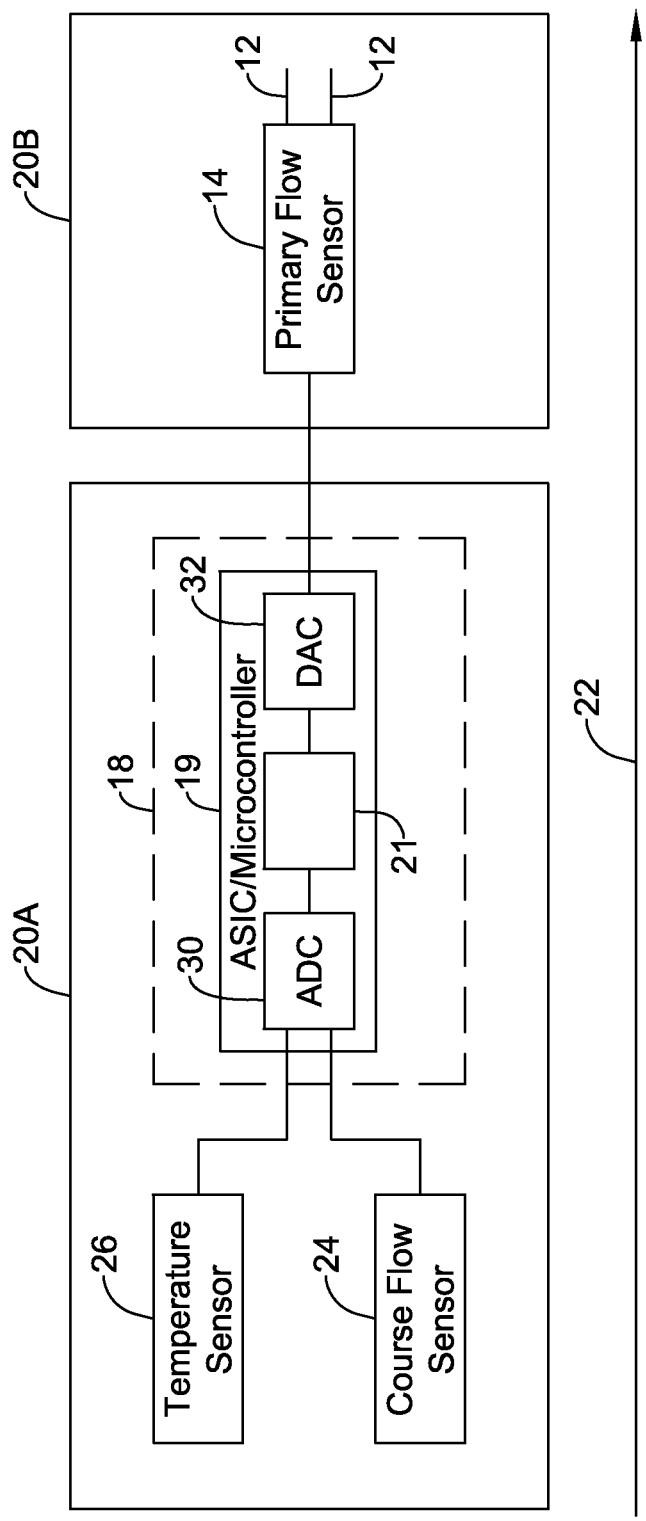
FIG. 4 is a schematic block diagram of another illustrative sensing assembly having a first die and a second die.

In some cases, the flow sensor assembly 10 may include one or more sense die 20. In some instances, where the flow sensor assembly 10 may include a single sense die 20, one or more of the first flow sensor 14, the second flow sensor 24, the control block 18, and the temperature sensor 26 may be positioned on the single sense die 20, as shown in FIGS. 2 and 3. Alternatively, in some examples, the second flow sensor 24, the control block 18, and the temperature sensor 26 (e.g., an ambient temperature sensor) may be positioned on a first die 20a and the first flow sensor 14 may be positioned on a second die 20b, such as shown in FIG. 4.

As discussed above, the first flow sensor 14 may include one or more temperature sense or sensor elements (e.g., resistors R1, R2, R3, R4, etc.) arranged in any manner (e.g., a Wheatstone bridge configuration or other configuration) that may provide an analog output signal 12 related to the flow rate of the fluid of the fluid stream. In some instances, and unlike analog outputs of typical flow sensors such as shown at 50 in FIG. 5, the analog output of the flow sensor assembly 10 may be substantially linear over an operating range of fluid flow, as shown at 60 in FIG. 6. For example, as discussed herein, the control block 18 may drive the heater 16 of the first flow sensor 14 such that the analog output signal of the flow sensor 14 bridge circuit is substantially linear over the expected operating range of flow rates and/or is substantially temperature independent over the expected range of temperatures.

FIG. 5 shows a typical set up for flow sensor assembly providing a non-linear analog output signal. As shown, to obtain a substantially linear analog signal from typical flow sensor assembly, the non-linear analog output of the flow sensor may be amplified with an analog amplifier 52, the amplified analog signal may be converted from analog to digital with an analog-to-digital converter 54, the digital signal may be compensated for temperature and shape with digital compensation math (algorithms) as shown at 56, and the compensated digital signal may be converted back to an analog signal with a digital-to-analog converter 58 that outputs a substantially linear analog signal over an operating range of flow rates. This compensation process, including converting the non-linear analog output of the flow sensor into the digital domain as shown at 54, can reduce the resolution and accuracy of the flow sensor output.

Figure 6:
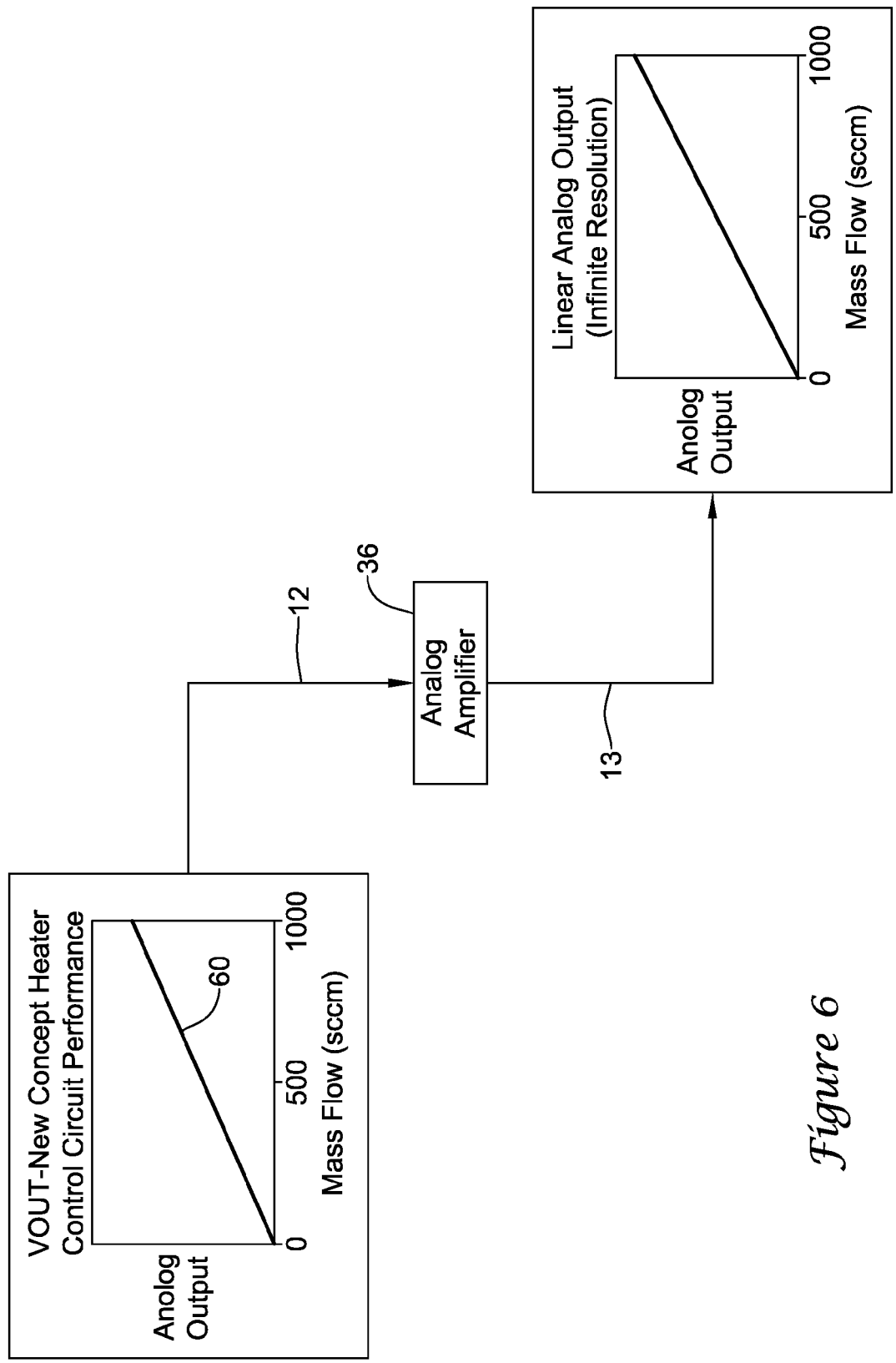
FIG. 6 is a schematic block diagraph of an illustrative post-signal production processing of a linear analog output signal from a flow sensor.

With the disclosed flow sensor assembly 10, and as shown in FIG. 6, the analog output signal 12 of the flow sensor 14 may have a higher resolution and a faster response time. For example, the analog output signal 12 may be amplified with an analog amplifier 36 to provide an amplified analog signal that has high (e.g. infinite) resolution because it has not been converted to a digital signal by an analog to digital converter. In addition to providing a high resolution amplified substantially linear analog output signal, the disclosed flow sensor assembly 10 may have a faster response time by cutting down on post-processing of an analog output signal, and in some cases, may reduce the cost of the sensor.

Figure 7:
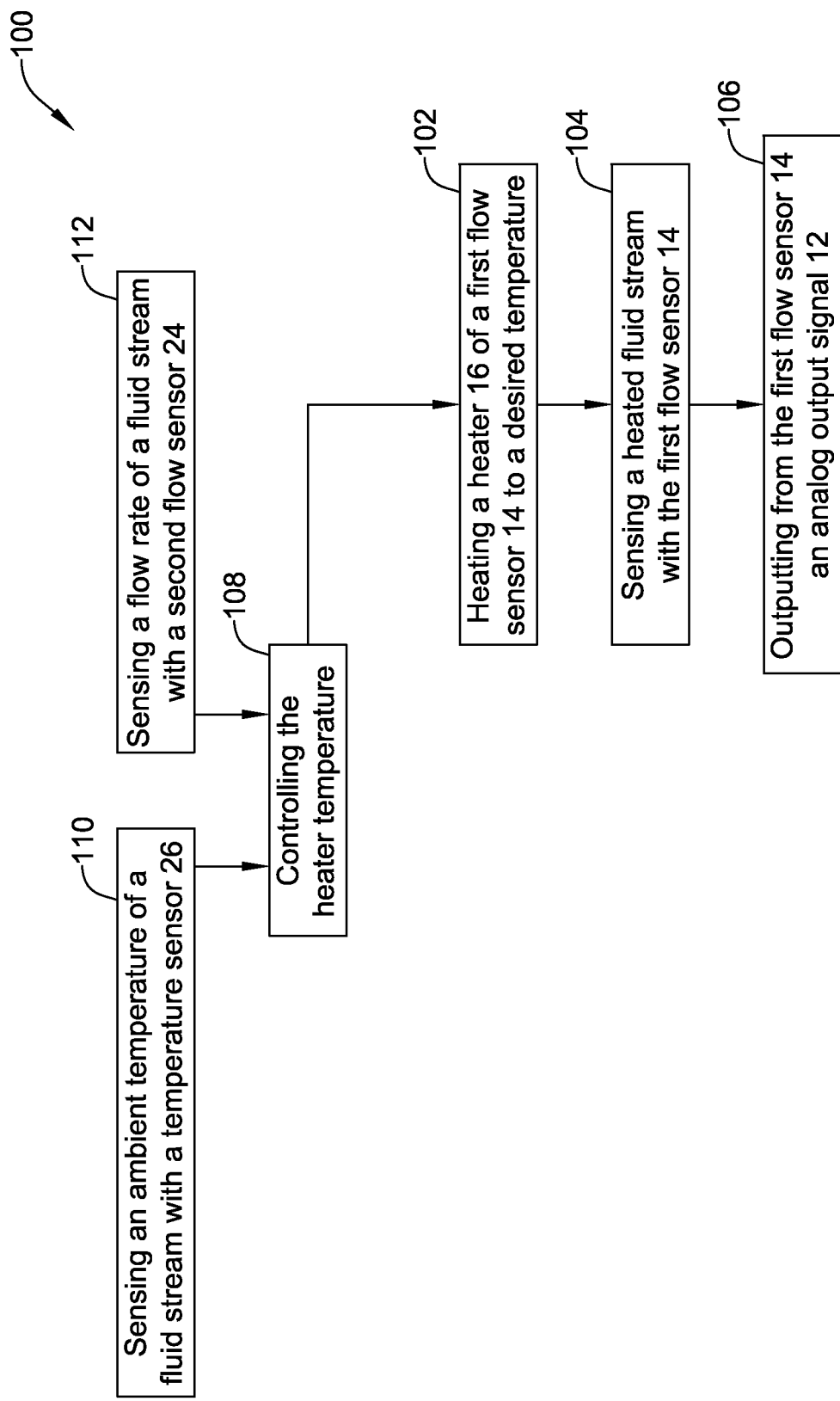
FIG. 7 is a schematic flow diagram of an illustrative method of operating an illustrative sensing assembly.

In some illustrative instances, such as shown in FIG. 7, the flow sensor assembly 10 may be utilized in a method 100 to measure a flow rate of a fluid stream over an operating range of flow rates of the flow sensor assembly 10. In some instances, the method may include heating 102 a heater 16 of a flow sensor 14 to a heater temperature that may be above a sensed ambient temperature of the fluid stream in order to heat the fluid stream. The heated fluid stream may then be sensed 104 using one or more sense elements, which may be spaced some distance from the heater 16. In some instances, once the heated fluid stream has been sensed, an analog output signal 12 from a primary flow sensor 14 may be outputted 106, where the analog output signal 12 may be related to the flow rate of the fluid stream based on results from sensing 104 the heated fluid stream.

In some instances, the heater temperature of the heater 16 may be controlled 108 based on a measure related to the flow rate of the fluid stream, where controlling the heater temperature may involve adjusting the heater temperature based at least partially on a measure related to a flow rate of the fluid stream. Illustratively, the heater temperature of the heater 16 may be controlled 108 such that the analog output signal is substantially linear over the operating flow rates of the flow sensor assembly 10.

In some instances, the method 100 of measuring a flow rate of a fluid stream over an operating range of flow rates of the flow sensor assembly 10 may include sensing 110 an ambient temperature of the fluid stream with a temperature sensor 26. The sensed temperature may then be used to control 108 the heater temperature of the heater 16. In some instances, a measure related to the flow rate of the fluid stream may be sensed 112 by a secondary flow sensor 24. The measure related to the flow rate may then be used to help control 108 the heater temperature of the heater 16.

In some cases, when the measure related to the flow rate of the fluid stream is received by the ASIC or microcontroller 19, the signal carrying the measure related to the flow rate of the fluid stream may be converted from an analog signal to a digital signal with an analog-to-digital converter 30. The conversion of the signal carrying the measure related to the flow rate of the fluid stream may be converted prior to the signal reaching the ASIC or microcontroller 19 or after the signal reaches the ASIC or microcontroller 19, depending on where the analog-to-digital converter 30 may situated in the flow sensor assembly 10.

In some instances, the controlling 108 of the heater temperature may be at least partially effected by determining a heater temperature sensor setting. In some instances, the measure related to the flow rate of the fluid stream and/or a sensed temperature of the flow may be used as input to a lookup table 21 to control the heater temperature of the heater 16. For example, the ASIC or microcontroller 19, which may include one or more lookup tables 21 and receive the measure(s) related to the flow rate of the fluid stream and/or the sensed temperature of the flow, may match the received measure(s) related to the fluid steam to a heater temperature setting in the lookup table 21, and output that setting to the first flow sensor 14 to set the heater 16 such that the first flow sensor 14 provides a substantially linear analog output signal 12 over an operating range of flow rates and may be substantially temperature independent over an operating range of temperatures.

In some instances, the signal(s) created from the lookup table 21 may be in digital form. In such instances, the digital signals may be converted to analog control signals with a digital-to-analog converter 32. Once the digital signal has been converted to an analog signal, the analog signal may be applied to the heater 16 of the first flow sensor 14.

Having thus described various illustrative embodiments of the present disclosure, those of skill in the art will readily appreciate that yet other embodiments may be made and used within the scope of the claims hereto attached. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor assembly for measuring a flow rate of a fluid stream across an operating range of flow rates, comprising:
 a sensor module comprising:
 a first flow sensor including a heater and two or more sense elements connected in a bridge configuration for sensing the flow rate of the fluid stream;
 a second flow sensor for sensing a measure indicative of the flow rate of the fluid stream;
 a control block operatively coupled to the second flow sensor, and the heater of the first flow sensor, the control block is configured to receive the measure indicative of the flow rate of the fluid stream from the second flow sensor, and based on the measure indicative of the flow rate of the fluid stream from the second flow sensor, drive the heater of the first flow sensor to a heater temperature that causes the bridge of the first flow sensor to provide an analog output signal that: 1) is indicative of the flow rate of the fluid stream; and 2) does not deviate from a perfect linear output by more than 10% over the operating range of flow rates of the flow sensor assembly.

2. The flow sensor assembly of claim 1, wherein the control block is configured to use the measure indicative of the flow rate of the fluid stream as an input to a lookup table to determine the heater temperature.

3. The flow sensor assembly of claim 2, wherein the lookup table includes values that are determined during calibration of the flow sensor assembly.

4. The flow sensor assembly of claim 1, further comprising an ambient temperature sensor for sensing an ambient temperature of the fluid stream, wherein the control block receives a measure indicative of the ambient temperature of the fluid stream, and wherein the control block is configured to drive the heater of the sensor module to a heater temperature that is dependent on the measure indicative of the flow rate of the fluid stream from the second flow sensor and the ambient temperature of the fluid stream.

5. The flow sensor assembly of claim 4, wherein the control block is configured to use the measure indicative of the flow rate of the fluid stream from the second flow sensor and the measure indicative of the ambient temperature of the fluid stream as inputs to one or more lookup tables to determine the heater temperature.

6. The flow sensor assembly of claim 4, wherein the sensor module, the control block, and the ambient temperature sensor are positioned on a common die.

7. A flow sensor assembly for sensing a flow rate of a fluid over an operating range of flow rates, comprising:
 a first flow sensor having a heating element;
 a microcontroller controlling the heating element of the first flow sensor such that the heating element is driven to a heater temperature;
 a second flow sensor providing a flow rate input of the fluid to the microcontroller; and wherein the microcontroller uses the flow rate input provided by the second flow sensor to control the heater temperature of the heating element of the first flow sensor such that the first flow sensor outputs an analog flow rate signal that does not deviate from a perfect linear output by more than 10% over an operating range of flow rates of the first flow sensor.

8. The flow sensor assembly of claim 7, further comprising:
 a temperature sensor configured to measure an ambient temperature of the fluid over an operating temperature range of the temperature sensor; and
 wherein the microcontroller controls the heater temperature of the heating element of the first flow sensor such that the first flow sensor outputs an analog flow rate signal that does not deviate from a perfect linear output by more than 10% over the operating range of flow rates and does not deviate by more than 10% due to temperature over the operating temperature range.

9. The flow sensor assembly of claim 8, wherein the microcontroller is configured to use the flow rate input provided by the second flow sensor and a measured value of the ambient temperature provided by the temperature sensor as inputs to a lookup table to determine the heater temperature.

10. The flow sensor assembly of claim 9, wherein the microcontroller comprises:
 an analog-to-digital converter receiving the flow rate input from the second flow sensor and/or an ambient temperature from the temperature sensor.

11. The flow sensor assembly of claim 10, wherein the microcontroller comprises one or more digital-to-analog converters for providing an analog control signal to control the heater temperature.

12. A method for measuring a flow rate of a fluid stream over an operating range of flow rates, comprising:
 heating a heater of a first flow sensor to a heater temperature that is above an ambient temperature of the fluid stream to heat the fluid stream;
 sensing the fluid stream that has been heated using one or more sense elements of the first flow sensor that are spaced from the heater;
 sensing a measure indicative of the flow rate of the fluid stream using a second flow sensor;
 controlling the heater temperature of the heater of the first flow sensor based at least in part on the measure indicative of the flow rate of the fluid stream sensed by the second flow sensor; and
 outputting from the first flow sensor an analog output signal that is related to the flow rate of the fluid stream based on the sensing step.

13. The method of claim 12, wherein the controlling step controls the heater temperature of the first flow sensor based on the measure indicative of the flow rate of the fluid stream sensed by the second flow sensor such that the analog output signal does not deviate from a perfect linear output by more than 10% over the operating range of flow rates.

14. The method of claim 12, further comprising sensing the ambient temperature of the fluid stream, and controlling the heater temperature based on the measure indicative of the flow rate of the fluid stream sensed by the second flow sensor and based on the sensed ambient temperature of the fluid stream.

15. The method of claim 12, further comprising converting the measure indicative of the flow rate of the fluid stream received from the second flow sensor from an analog signal to a digital signal.

16. The method of claim 15, further comprising:
determining a heater temperature setting, and converting the heater temperature setting from a digital value into an analog heater temperature control signal that is provided to the heater of the first flow sensor using a digital to analog converter.

17. The method of claim 12, further comprising using the measure indicative of the flow rate of the fluid stream sensed by the second flow sensor as an input to a lookup table to control the heater temperature of the heater of the first flow sensor.

* * * * *